United States Patent

[11] 3,632,310

[72] Inventor Arthur F. Johnson
 203 Creole Lane, North Gate Urban Farms,
 Franklin Lakes, N.J. 07417
[21] Appl. No. 677,353
[22] Filed Oct. 23, 1967
[45] Patented Jan. 4, 1972

[54] PROCESS FOR MANUFACTURING ALUMINA
 22 Claims, 4 Drawing Figs.
[52] U.S. Cl..................................................... 23/143,
 23/52
[51] Int. Cl..................................................... C01f 7/02,
 C01f 7/06, C01f 7/14
[50] Field of Search........................................... 23/141,
 143; 75/101

[56] References Cited
 UNITED STATES PATENTS
| 2,701,751 | 2/1955 | Porter........................ | 23/143 |
| 3,372,985 | 3/1968 | Roberts et al................ | 23/143 |
| 3,413,087 | 11/1968 | Roberts....................... | 23/143 |
| 2,606,820 | 8/1952 | Harms......................... | 23/273 L |

Primary Examiner—M. Weissman
Attorney—Marn & Jangarathis

ABSTRACT: In both the European and American versions of the Bayer alumina process, precipitation of alumina trihydrate from the caustic solution is limited to about one-half of the alumina in solution, in order to obtain a product of commercial specification grade. The partly-spent caustic is recycled to the digestion state. In the process of this invention, the partly-spent liquor is further cooled to intentionally precipitate very fine particles of alumina hydrate. This is separated from the spent liquor which is recycled to digestion. The fine alumina is dissolved in a reheated sidestream of the clarified pregnant liquor to provide a hot, saturated liquor which is combined with the remaining clarified pregnant liquor, enriching it in alumina. More than 50 percent of the alumina in this richer liquor is recovered from precipitation as specification grade alumina. The recycled spent liquor has a correspondingly greater capacity to dissolve alumina from the bauxite ore due to its lower alumina content. The smaller volume of recycle liquor compared to bauxite digested therein also aids desilication, and proportionately lessens evaporation and filtration loads. The process of the invention can be used in existing European or American Bayer process plants and, with slight modification in processing steps and conditions, essentially any type of bauxite ore can be treated.

INVENTOR.
Arthur F. Johnson
BY
Marn & Jangarathis
ATTORNEYS

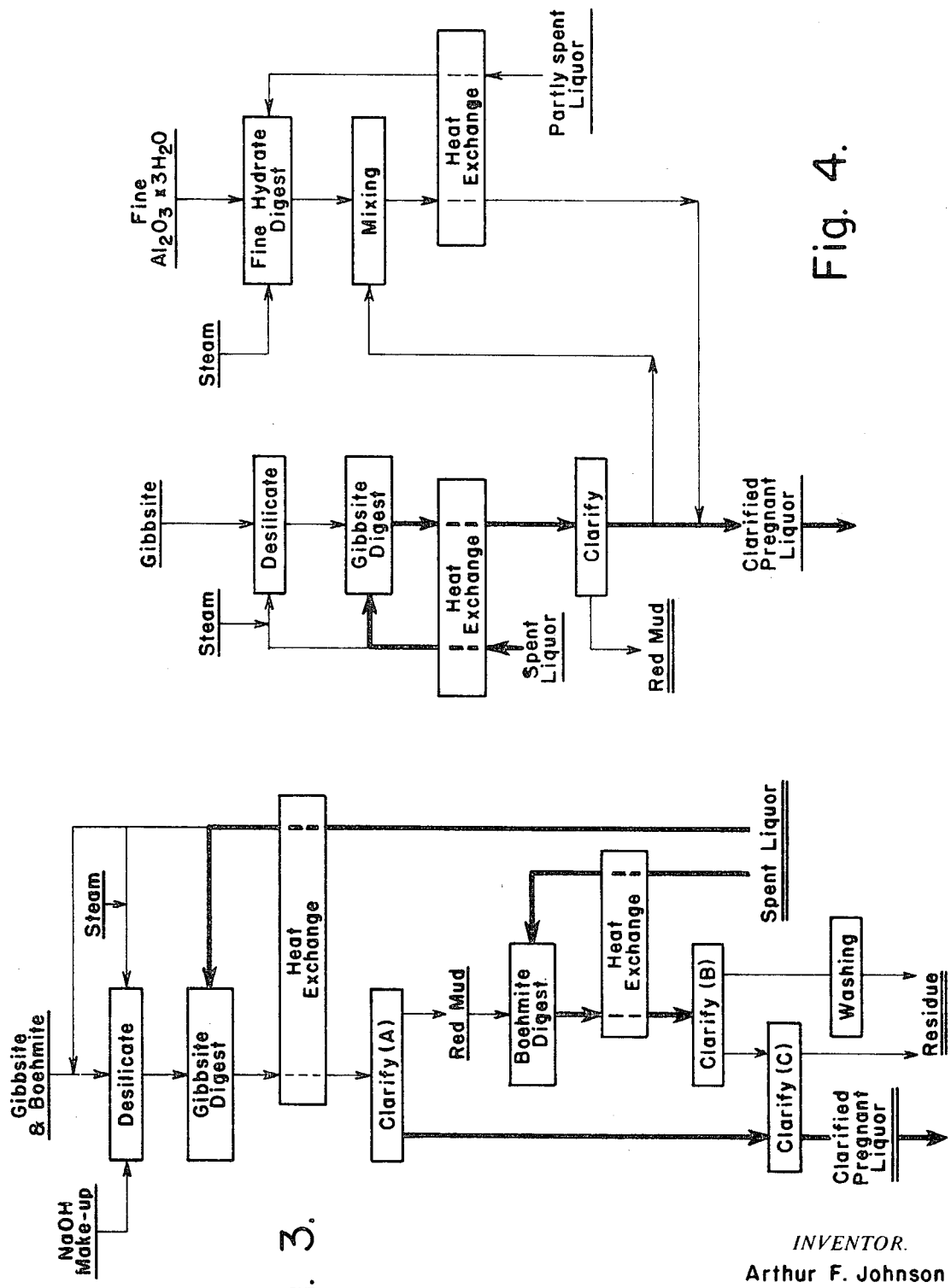

3,632,310

PROCESS FOR MANUFACTURING ALUMINA

BACKGROUND OF THE INVENTION

1. Field of the Invention

This invention relates generally to manufacturing alumina from bauxite minerals and, more particularly, it relates to the manufacture of alumina by the Bayer process. The process of the invention is applicable to improving the efficiency of existing Bayer process installations as well as new plants, and can be used in both the European and American versions of the process.

2. Prior Art

A proper understanding of the present invention requires some knowledge of the Bayer process and the raw materials used therein.

While many processes have been proposed for the recovery of alumina from the many materials in which it occurs, the Bayer process, described by the inventor in U.S. Pat. No. 515,895, is the only one which has achieved universal success. This process requires high-grade bauxite ores for economic operation, "high grade" in this instance meaning a low-silica content. The term "bauxite" is applied generally to aluminous high-iron clays, sometimes referred to as laterites. The aluminum content of bauxites is generally in the form of alumina trihydrate ($Al_2O_3 \cdot 3H_2O$) called gibbsite, or alumina monohydrate ($Al_2O_3 \cdot H_2O$) called boehmite. It will be understood that there are some other, rarer mineral phases (the monohydrate also occurs as diaspore, for example), but the terms gibbsite and boehmite will be used herein to indicate, respectively, the tri- and monohydrates generally. Bauxite ores rarely, if ever, contain the aluminum as gibbsite *or* boehmite, but as mixtures thereof. The relative proportions of the two minerals are important because gibbsite is readily soluble in caustic at significantly lower temperatures than boehmite.

Briefly, the Bayer process involves the initial digestion of the ground ore in hot caustic to produce a sodium aluminate solution and a residue, followed by precipitation of alumina trihydrate onto hydrate seed crystals and recovery, by calcining, of anhydrous aluminum oxide. The quantity of seed used may vary from 20 to 100 percent of the amount of alumina in solution, and is inversely proportional to the fineness of the seed, expressed as total seed surface. In the U.S., available bauxites have gibbsite as the dominant mineral phase, and the U.S. Bayer process employs digestion at relatively low temperatures. Contained boehmite is not digested under these conditions, and efforts to extract it from the residue have only been marginally successful. In Europe the proportion of boehmite in available ores is much higher, and a higher temperature digestion is employed.

In discussing Bayer process parameters, certain conventions have arisen which ought to be understood. Thus, the "available alumina" in the ore is the theoreticaLly extractable alumina. As a general rule, this can be calculated as the total alumina less 1.2 times the silica content. The percent of extraction achieved in a Bayer installation is always a percent of the available alumina. The alumina and caustic concentrations in Bayer process streams are important, but the ratio between them, called the "saturation ratio" or "*a/c* ratio," is even more important. The saturation ratio is generally expressed as the ratio of alumina to free soda, the latter term being equivalent to sodium hydroxide expressed as sodium carbonate. The practical working limits of *a/c* ratios in American Bayer practice range between 0.3 for spent liquor, below which precipitating hydrate particles are too fine, and 0.6 for the pregnant liquor after digestion. While a higher saturation ratio is obviously desirable, the upper limit of about 0.6 is necessary, due to the danger of spontaneous alumina precipitation prior to filtration of the residue. This will blind the filters, with immediate, disastrous results. Neglecting evaporation, dilution, etc., of the liquor as factors, it can be said that caustic content of the liquor during the process is fairly constant through the digestion and precipitation steps. Thus, the alumina content of the liquor varies directly with the *a/c* ratio. For example, a liquor having a causticity of 170 grams per liter will contain 51 grams per liter alumina in the spent liquor (0.3×170) and 102 grams per liter alumina in the pregnant liquor (0.6×170). It is to be emphasized that, in accordance with the present invention, by increasing the saturation ratio after clarification and reducing this ratio in the spent liquor, there is an overall increase in the amount of alumina hydrate recovered from each cycle of the flowstream. This is done without danger of blinding the filters, and with a significant increase in the production of specification grade alumina.

The alumina content of an ore will generally dissolve in the caustic very quickly. What takes time at this stage of the process is desilication: the reaction wherein the silica content of the ore is taken into solution and reprecipitates as a complex sodium-aluminum-silicate having a zeolite structure. The insoluble residue is referred to as red mud, its color coming from the iron content. Iron and titanium oxides together with the sodium-aluminum-silicate complex constitute the principal red mud ingredients other than moisture.

After filtering the pregnant liquor to remove red mud, which is usually preceded by sedimentation, the solution is cooled to precipitation temperatures and seeded with finer crystals of alumina trihydrate than the desired specification grade hydrate. Precipitation proceeds over a length of time, and about half of the contained alumina is removed from solution, as the trihydrate.

The reason more of the alumina is not removed is that the size of some of the precipitating crystals are too small and cause excessive dust losses in handling during transportation and use in aluminum reduction cells. The liquor, at a saturation ratio of about 0.3, is reheated to digestion temperatures and recycled to dissolve more ore. As will be readily appreciated, the circulating load of liquor and dissolved alumina is a large one.

As might be expected with any process that has as many drawbacks and problems as the Bayer process, there have been over the years, many efforts to improve it. There have also been efforts to design completely different processes, but they are of no concern herein.

Continuous digestion is now a well-established practice. One such scheme is described in U.S. Pat. No. 2,107,919. Several efforts have been made to recover both mono- and trihydrate phases. In U.S. Pat. No. 2,701,752, digestion of monohydrate is carried out initially and a low saturation ratio is achieved, and thereafter a trihydrate ore is digested, raising the saturation ratio. In U.S. Pat. No. 2,852,343 the two digestion steps are carried out separately and the two streams are thereafter combined. The time necessary for desilication is said to be shortened by recycling sand pellets recovered from the red mud, according to U.S. Pat. No. 2,785,956.

While the improvements proposed for the Bayer process are many and varied, none have overcome the problem of the low yield of alumina of the proper size and the large circulating load of caustic and alumina.

It is noted that the foregoing discussion has treated the Bayer process only in the most general terms; specific operating practices and procedures are described in detail hereinbelow to illustrate the improvements achieved by the present invention. Other terms not treated in the foregoing are defined hereinbelow.

OBJECTS OF THE INVENTION

It is a general object of the present invention to provide an improved process for recovering specification grade alumina from bauxite minerals.

Another object of the invention is to improve the yield and efficiency of the Bayer process.

A further object of the invention is to provide a process whereby the output of Bayer-process plants can be increased significantly without substantial capital investment.

A still further object of the invention is to provide a method whereby more than 50 percent of the alumina in Bayer-process pregnant liquor is recovered as specification grade alumina.

Yet a further object of the invention is to provide a recycle liquor capable of dissolving greater quantities of ore.

Another object of the invention is to provide a digestion scheme amenable to gibbsite and boehmite materials.

Yet another object of the invention is to provide a method of digesting gibbsite and boehmite materials which is thermally economical.

A further object of the invention is to provide an improved Bayer process which is adaptable to both the European and American versions thereof.

Still another object of the invention is to provide an improved version of the Bayer process which produces alumina of a lower silica content.

A still further object of the invention is to provide an economic method of insolubilizing the silica in bauxite which readily dissolves in Bayer-process solutions prior to dissolution of the bulk of the alumina therein.

Various other objects and advantages of the invention will become clear from the following detailed description of several embodiments thereof, and the novel features will be particularly pointed out in connection with the appended claims.

BRIEF DESCRIPTION OF THE DRAWINGS

The invention may be better understood by reference to the attached drawings, in which:

FIG. 3 and FIG. 4 are variations of section A of FIG. 2; FIG. 3 is more specifically suited for plants treating mixtures of gibbsite and boehmite minerals, and FIG. 4 is more specifically suited for treating gibbsite ores containing a maximum of a few percent boehmite.

Figure 1:
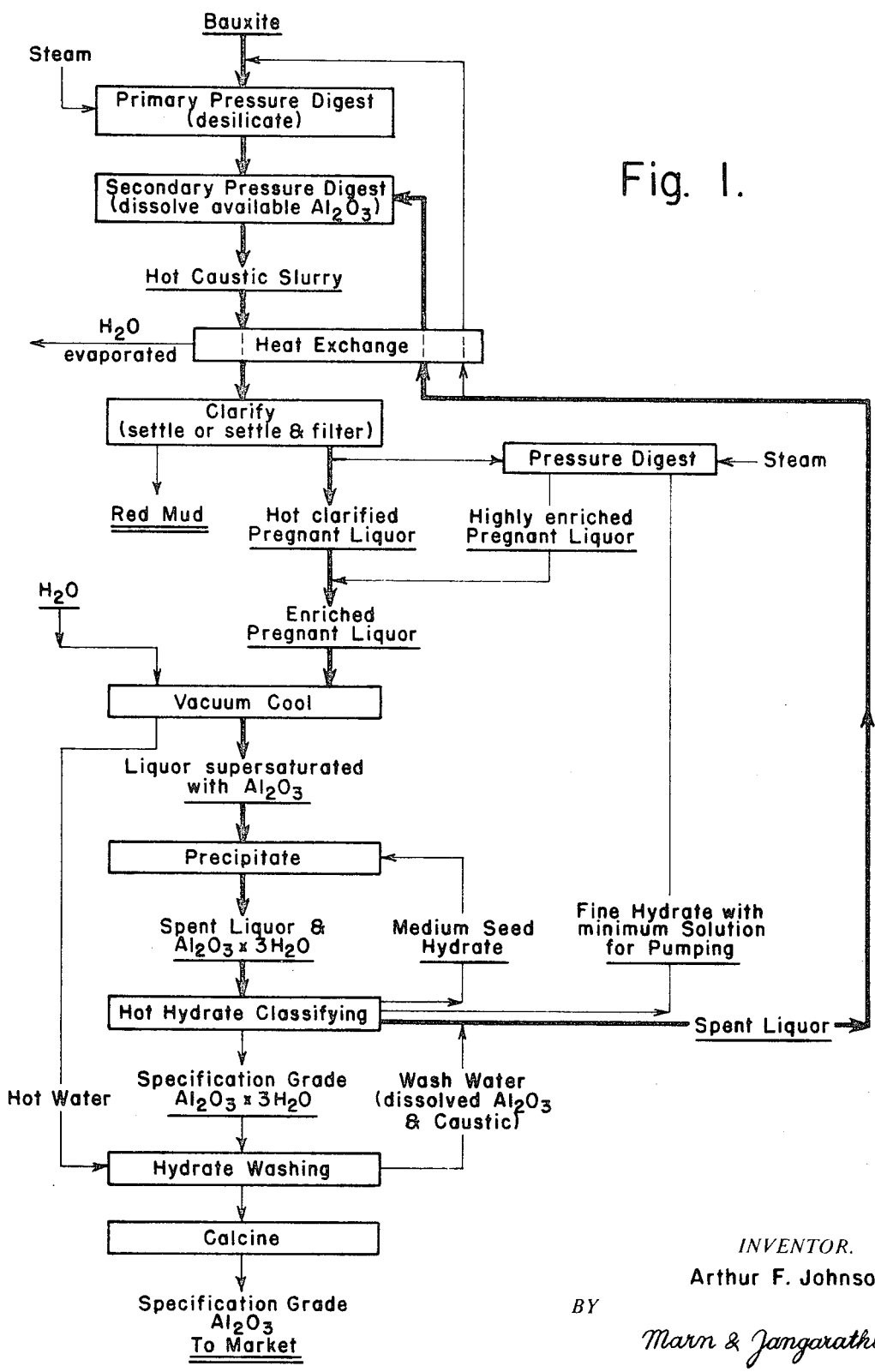
FIG. 1 is a greatly simplified flowsheet illustrating the process of the invention generally.

In the drawings, heavy lines are used to indicate major flow streams and light lines indicate lesser flow streams.

SUMMARY AND DESCRIPTION OF EMBODIMENTS

The present invention comprises, in essence, precipitating from the cooled liquor not only alumina particles of commercial specification grade, but by further cooling of all or a portion of the liquor, precipitating fine, nonspecification sizes. These fine particles are redissolved in a novel separate stream of clean, pregnant or spent liquor, which needs no filtration, and then reprecipitated by cooling as specification grade particles. The further-cooled and more-spent liquor (as compared to American Bayer-process solutions) is recycled to digest bauxite and utilized to simplify desilication and digestion steps in a novel manner. The process of the invention increases the production of specification grade alumina from any given Bayer digestion process stream without increasing, proportionally, all the equipment that would be needed in conventional processes utilizing the prior art. In conventional plants, for every 10 tons of alumina in solution after digestion, an average of about 115 tons (and a maximum of about 400 tons) of caustic liquor may be cyclically recirculated through the digestion step. Out of every 10 tons of alumina in solution after digestion, 5 tons of alumina may be precipitated and calcined. The present process may, by contrast, recover 5.5 to 8 or more tons of specification grade alumina. It does this by the above-stated step of further cooling the ore digestion liquors in a continued or separate precipitation step to further deplete them of alumina, in the form of very fine hydrate particles, so each ton of spent liquor, when then returned for reheating and for digesting, has an avid additional solubility for dissolving alumina. In addition, this process is used to enrich the pregnant liquor stream after it has been filtered of red mud by blending with it the hotter and richer (in alumina) liquor stream made by dissolving off-specification alumina hydrate particles, so the capacity of each ton of liquor (in the combined streams) to precipitate specification grade alumina is increased to near the maximum attainable at atmospheric pressure.

It should be understood that in the conventional American-Bayer or European-Bayer processes, as currently practiced, some fine aluminum hydrate particles are purposely precipitated and utilized to seed the mother liquor entering the precipitators. Such seed is likewise necessary in the practice of the present invention. In fact, another advantage of the invention is that seed which is off-specification by virtue of being too small in size or too high in silica content may be redissolved by the process of this invention instead of being utilized as inferior seed. It should also be understood that, as used in Bayer-process terminology the word "precipitation" includes growth of seed particles by precipitation of alumina thereon or agglomeration of small particles to form larger particles, both of which will produce alumina of commercially acceptable size after calcination. In the precipitation process, some new particles may be formed spontaneously or by breaking of larger particles to form smaller ones. "Specification grade alumina," as used in the description of this invention, means a grade suitable for commercial sale as a raw material for the reduction of alumina in an electrolyte of fused fluorides. Such alumina contains, ordinarily, from 0.02 to 0.04 percent of iron oxide and the same of silica, usually 0.002 to 0.004 percent of titania, 0.005 to 0.02 percent of each of gallium and vanadium and perhaps traces or more of magnesium, zinc, phosphorous and various other metals depending on the source of the bauxite. Sodium oxide in the alumina may average 0.5 to 0.7 percent and calcium oxide 0.03 to 0.06 percent. In the United States there is a preference for a grade of alumina with coarser particles known as "sandy" alumina having an angle of repose <40°. In Europe there is a preference for a finer grade known as "floury" alumina having an angle of repose of 40°–50°. Sandy alumina may be made from hydrate containing on the order of 15 percent minus 325 mesh and 55 percent coarser than 200 mesh, while floury alumina will usually be made from hydrate containing as much as 33 percent minus 325 mesh and perhaps 57 percent coarser than 325 mesh, but finer than 100 mesh and about 10 percent coarser than 100 mesh. Tyler mesh size of 325 corresponds to a particle size of about 44 microns, and dust losses during calcining become prohibitive when particles much finer than this are manufactured. Either sandy or floury alumina can be produced by choice of size classification conditions in aluminum hydrate production, followed by temperature and chemical additive control in calcination of hydrate, all of which measures are well known in prior art.

In caustic solutions supersaturated with alumina below 212° F. the stable dispersed phase precipitating is aluminum trihydrate ($Al_2O_3 \cdot 3H_2O$). Above 212° F. the precipitate is aluminum monohydrate ($Al_2O_3 \cdot H_2O$). Since precipitation in the Bayer process, as currently practiced, is usually done at 180° down to 140° F., the precipitated particles are of the trihydrate variety. Ores amenable to the Bayer process which contain all the available (extractable) alumina as trihydrate actively dissolve in caustic solutions even below 212° F. Examples of such ores containing practically all available alumina as trihydrate are found in British and Dutch Guiana, West Australia, Guinea in Africa and certain mines in Jamaica. In the American Bayer-process digestion of such ores, suitable causticity, temperature and time for digestion are not dictated so much by conditions necessary to make the trihydrate alumina soluble as by conditions that will first dissolve the soluble silica and then reprecipitate it. Such ores may contain 1 to 20 percent $SiO_2$ as an unwanted impurity which carries with it, when precipitated in the digesters, about its own weight of alumina and caustic (calculated as $Na_2CO_3$) in a hydrated sodium-aluminum-silicate complex which is removed in the red mud. Alumina available to Bayer-process extraction is thus limited to any soluble silica, which reprecipitates with its weight of alumina and caustic as a complex compound hereinafter called Na-Al-Si complex. Another advantage of the present invention is that it precipitates the silica more completely in the digestion step, leaving less silica to contaminate the alumina in the subsequent alumina precipitation step. A lower silica content in the alumina is highly desirable, because silica reduces the electrical conductivity of the aluminum metal produced. Lower silica is obtained by the invention because any given Bayer-process liquor employed will not only dissolve more bauxite per ton of liquor, but will also precipitate more silica, by the law of mass action. Since more silica (from a greater quantity of bauxite) is dissolved per ton of liquor than in the conventional process, this must, by Nerst's law of solubility product, precipitate silica down to the same level per ton of solution. In effect, all the silica in the additional bauxite dissolved or digested in a given quantity of liquor by this invention is precipitated during at least two digestion steps and eliminated in the red mud. With a greater quantity of alumina in the same liquor, the proportion of silica is thus less than with conventional liquors. This is a great advantage, because most of the impurities in the calcined alumina become impurities contaminating the molten aluminum produced therefrom.

To further extend and intensify silica precipitation, it is an additional concept of this invention to stir or grind bauxite with only the minimum amount of spent liquor needed to effectively pump it as a pulp of about 30 to 50 percent solids, and then subject this thick pulp to sufficient temperature and time to desilicate it before mixing the pulp with enough additional spent liquor to dissolve all the available alumina. The precipitation of silica dissolved in Bayer solutions requires several hours (for example, 6 hours) at 200° F., only one-half to 1 hour at 290° F. and 5 to 10 minutes at 400° F. Usually, the trihydrate alumina has dissolved in the Bayer liquor long before the silica has both dissolved and then more slowly precipitated. Hence, practicing this invention by mixing all the gibbsite bauxite with, for example, only 4 to 50 percent of the return spent liquor to which has been added the makeup caustic and enough steam to raise this small percentage to primary digestion temperature (290° F.) will greatly save on fuel, if the remaining streamflow at a lower temperature joins the first flow in the second of a series of digesters. The combined flow is operated at 230° to 260° F., which temperature is as high as needed to dissolve the available trihydrate alumina in a solution which will be supersaturated as high as possible without premature alumina precipitation occurring in the red mud filters and blinding them. Although this same process variation is applicable for the use with boehmite bauxite, it may be necessary for the main flowstream to be almost as high temperature as the 4- to 50-percent stream (with which the bauxite and makeup caustic has been mixed), because the monohydrate alumina in the boehmite requires digestion at high temperature to make it soluble. Nevertheless, with either gibbsite or boehmite ore, initially digesting all the bauxite with a relatively small percentage of the total flow precipitates the quickly dissolved silica more completely by the law of mass action and the law of solubility product, as aforementioned, with the end result that the silica content of the clarified pregnant liquor is less, as is the silica content of alumina precipitated therefrom. In accordance with the invention, kaolin-type silica in bauxite is dissolved during digestion more rapidly than alumina, and then more slowly reacts with dissolved alumina to form the Na-Al-Si complex precipitate.

When, by the practice of this invention, nonspecification aluminum trihydrate particles are dissolved in a separate stream of caustic liquor, the time and temperature needed therefor are dependent solely on that required to saturate the solution. This is only a few minutes, providing the particles are sufficiently fine, which they usually are. This is so because they constitute excess quantities of fine sizes unsuitable for making commercial alumina or even seed. This affords economy in apparatus needed, compared to that needed for the digestion of bauxite ores outlined above. Where specification alumina particles are to be made out of nonspecification particles, only a small digester is needed following the heat exchangers needed to heat up a sidestream of pregnant liquor or the spent liquor solutions. Alternatively, the digester itself may be heated with steam injected directly therein. The maximum temperature needed will usually be about 290° F. in order to supersaturate a large enough flow stream so that, when it is mixed with the pregnant liquor (consisting of the main bauxite digestion stream after filtering out the red mud), it will be supersaturated when cooled from filtering temperature (200°–225° F.) down to precipitation temperature, and still produce specification alumina. The caustic concentrations of conventional American-Bayer process of 150 to 200 grams per liter of caustic soda, expressed as $Na_2CO_3$, is preferably maintained. In order not to require an increase in the number of precipitators, the stream of caustic spent liquor used to dissolve the off-specification alumina hydrate particles should be kept a fraction of the flow (5 to 50 percent) of the bauxite digestion flow. The smaller this flow, the hotter it should be heated, in order that it may completely dissolve all off-specification alumina in a solution of high enough alumina content to suitably enrich the digestion liquor after red mud filtration, when it is blended therewith. It is customary to supersaturate such digestion liquor after filtration by cooling in vacuum evaporators to 180° F. or less. The heat recovered from cooling the blended solutions constitutes part of the heat necessary for reheating the spent liquor after precipitation. It is noted that the enriched stream of the present invention may be supersaturated before it reaches 180° F., and may even reach this condition at 210° F.

In digesting ores above 290° F., any aluminum trihydrate dissolved may reprecipitate during digestion as aluminum monohydrate which has roughly one-half the solubility of the trihydrate. Such reprecipitation is encouraged by the presence of monohydrate seed contained in the mineral boehmite of ores from Europe, Northeastern Australia and some parts of Jamaica and Haiti. Reprecipitation causes the alumina to be lost in the ca clarification step by reporting with the red mud impurities. Thus, in the case of digesting boehmite ores, digestion temperature is regulated in accordance with the amount of boehmite present in excess of 3 to 5 percent. Above such percentages, economic extraction in the neighborhood of 90 percent of the available alumina cannot be made unless digestion temperatures of 350° to 450° F. are used. At these temperatures, desilication of the caustic solutions proceeds as rapidly as does the digestion of the boehmite, and both are complete in 5 to 15 minutes. Compared with alumina plants digesting gibbsite ores, those treating boehmite ores are more expensive in capital costs which may range from $120 to $190 per annual ton alumina calcined compared with $90 to $110 for gibbsite ores. Alumina plant operating costs when digesting boehmite ores are higher than when digesting gibbsite ores because the higher temperature of digest requires more fuel, and the amount of alumina dissolved by a caustic solution of any given causticity and temperature is comparatively less. For these reasons this invention, which permits recycled Bayer digestion liquors to have (a) greater solvent power and (b) greater specification grade precipitating capacity, is more beneficial to plants utilizing boehmite ores than gibbsite ones, although either type plant benefits, as will be shown in the following examples. In the examples, some details of causticity, amounts of evaporation and temperatures of digestion are purposely omitted to avoid complicating factors which do not restrict the utilization of this invention, i.e., ranges for these factors are those customarily employed and are familiar to those skilled in the art.

The accompanying drawings, which are simplified flowsheets illustrating several embodiments of the invention, do not indicate any particular type of equipment to be used at the various stages, and it is to be emphasized that equipment of conventional design such as is employed in presently existing Bayer plants is entirely adequate for carrying out the invention. Existing plants may be converted to the process of this invention by merely operating at different temperatures, flow rates and with appropriate interconnections required by the invention. For example, in the case of the digesters where several are connected in series in a conventional plant, the first, or primary digester in the series may be connected to receive 10 percent of the return spent liquor mixed with ground bauxite at 200° F. and 20 percent of the return spent liquor at 270° F. together with enough steam to desilicate the total 30 percent at 310° F. for perhaps 20 minutes. After such approximate residence period, the contents of the primary digester are discharged continuously into a secondary digester where they are joined by the other 70 percent of the spent liquor flowstream and the digestion continued at 280° F. for 15 minutes. With such short residence times per digester, compared to conventional practice at these temperatures, flow rates in gallons per minute through existing digestion equipment may be doubled or even tripled, but with the assurance that extraction and desilication will be equal or better than with conventional practice.

In the case of precipitators, conventional equipment may also be used with the advantage that the pregnant solutions entering will be generally higher in temperature and having a higher a/c ratio, compared with conventional practice. Every 10° F. about doubles the rate of precipitation of alumina hydrate on seed, so the enriched solutions utilized herein require little extra time to precipitate out their extra contained alumina. In order to cool the precipitator solutions and particularly down as low as 100° F. or less, high-volume airstreams supplied by fans may be directed down on the surface of the solution in the precipitators and/or the Dorr thickeners following these wherein hydrate is separated from spent liquor. Besides cooling, these airstreams serve to evaporate off wash water added in the process of washing mud and hydrate and serve to break the bubbles of foam that sometimes becomes troublesome. Although this novel method of cooling affords a positive means of obtaining relatively complete precipitation in extreme conditions and release of the heat of crystallization of $Al_2O_3 \cdot 3H_2O$, the solubility of alumina in an American-Bayer liquor having about 180 grams per liter of caustic (as $Na_2CO_3$) is such that an a/c ratio of 0.20 may be reached at about 130° F. From this it will be seen that the results claimed by the invention are readily obtainable, especially since even boehmite ores may be digested with this caustic strength and high digestion temperature.

The three-stage hydrate classifiers used in conventional Bayer-process plants will ordinarily be found suitable for this invention if the coarsest hydrate from primary classification is used for specification hydrate, the secondary (medium size) hydrate is used for seed and the tertiary (finest) hydrate is used for enriching solutions before precipitation. Some flexibility is always needed in the choice of seed used, since the product sizes coming from the various classifiers will vary some from hour to hour. Thus, seed will be chosen from the secondary and tertiary classifiers to give the necessary surface area and particle size to produce specification grade hydrate. Any hydrate so fine that it will require two or more precipitation cycles to become specification grade may be generally considered economically suitable for resolution and enrichment of pregnant solutions. Heretofore, it has been a problem to enlarge such very fine hydrate crystals to specification alumina if an excess of them were precipitated, which often happens unintentionally in conventional practice.

Figure 2:
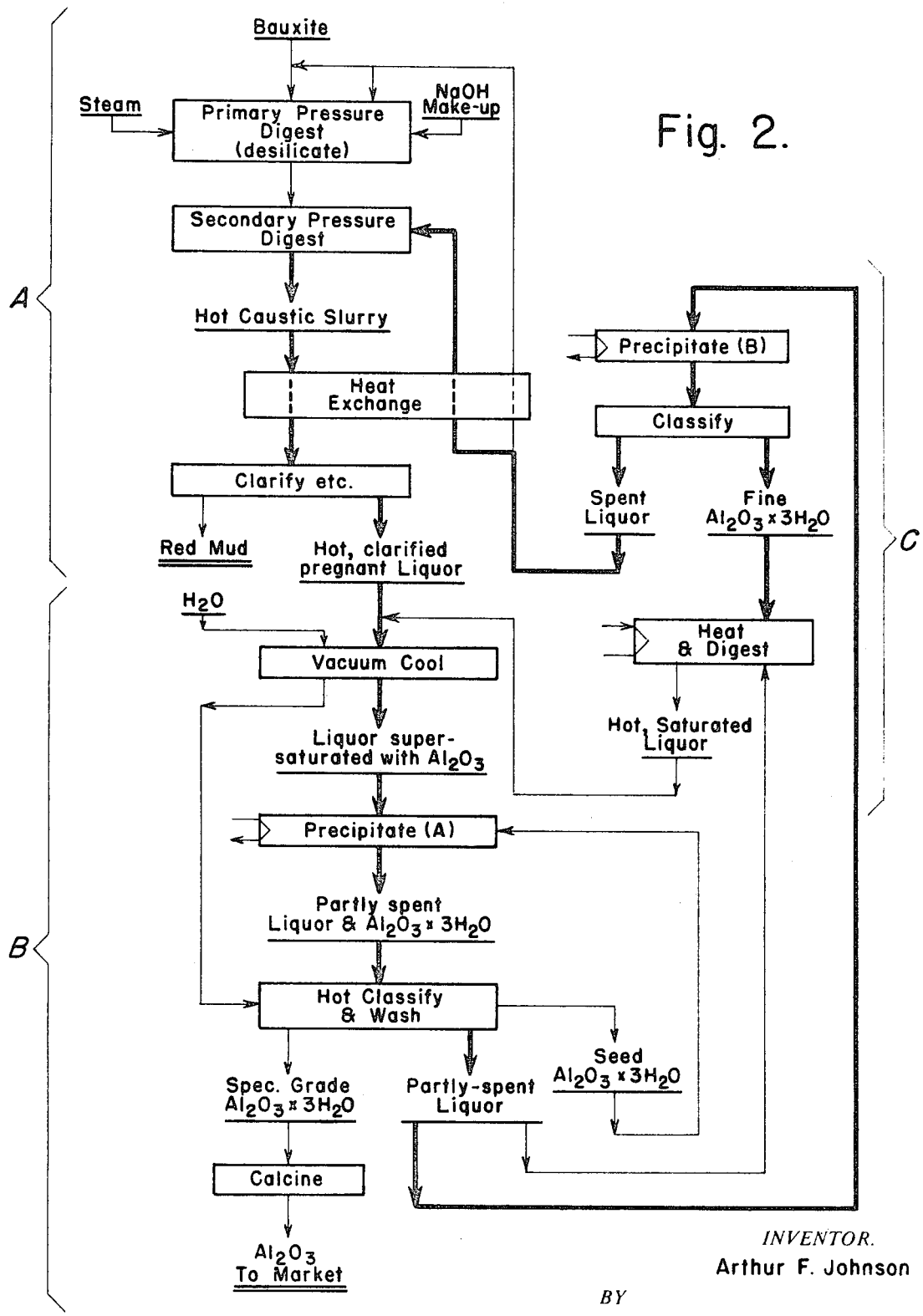
FIG. 2 is a variation of the flowsheet of FIG. 1.

With reference to FIG. 1, all of the steps illustrated therein are conventional Bayer-process steps except the pressure digest of fine hydrate with a sidestream of hot, clarified pregnant liquor and return of the highly enriched pregnant liquor to the main stream entering the vacuum cooler. Also, the main recycle stream of spent liquor is shown as going to the secondary pressure digest step as outlined above. In FIG. 2, sections of the flowsheet marked A and B are essentially conventional Bayer equipment, and section C defines steps requiring additional equipment to carry out the invention, as discussed more fully hereinbelow.

EXAMPLE I

The flowsheet of FIG. 1 is employed. A stream of pregnant caustic liquor, after digestion of an alumina trihydrate ore and clarification, is at a temperature of 200° F., flows at 5,000 liters per minute and contains 102 grams per liter of alumina at a/c 0.60. In accordance with the invention, the stream is divided into two streams of 4,000 liters per minute and 1,000 liters per minute. The latter, smaller stream is reheated by heat exchange and steam to 310° F., and very fine alumina trihydrate with minimum water needed for pumping from the hydrate classifiers is injected continuously into a digester where it is dissolved completely. The very fine hydrate is dissolved in sufficient quantity so that the flowstream averages 142 grams per liter of alumina. This stream is cooled, partly by heat exchange with the incoming stream to 250° F., and finally by admixing with the remaining 4,000 liter per minute main stream which lowers the recombined 5,000 liter per minute stream to 210° F. and 110 grams per liter alumina content. This is cooled in the vacuum evaporators to 185° F., and rapid precipitation is started with alumina seed from the hydrate classifiers. Cooling by evaporation during precipitation is continued by (a) fans flowing air jets downward on top of the liquor surface circulating in the precipitators, as well as (b) by air circulation of the liquor within the precipitators utilizing the Pohle airlift principle conventional in American practice. A final a/c ratio of 0.25 and an alumina content of 43 grams per liter is attained in the spent liquor. Thereafter, the hydrate is separated from the spent liquor and classified into specification alumina, seed and fine hydrate. The specification alumina produced amounts to 59 grams per liter out of the 102 grams per liter originally dissolved into the liquor, or about 57.5 percent recovery per cycle. This is about 15 percent better than the 50 percent recovery common in good conventional American practice.

EXAMPLE II

A stream of caustic liquor cyclically digesting bauxite in a digester at a flow rate of 4,000 liters per minute and containing about 100 grams per liter of alumina after clarification at 200° F. is, in accordance with the invention as shown in the FIG. 2 flowsheet, enriched by blending it with a stream of caustic liquor having off-specification aluminum hydrate particles dissolved therein at a flow rate of 1,000 liters per minute and containing 130 grams per liter of alumina, after evaporative cooling to above 220° F. The blended stream, flowing 5,000 liters per minute and containing 106 grams per liter of alumina at 204° F., is vacuum cooled to 190°–180° F., where precipitation of specification grade alumina particles begins and continues down to 140° F., at which point about 50 grams per liter of alumina remains in solution. The specification grade alumina precipitated is 56 grams per liter from about 5,000 liters or 280 kilograms per minute. Thereafter, about 4,000 liters per minute of the partly spent 140° F. liquor is withdrawn from the precipitators, and the specification product particles are separated from the seed particle inventory (which seed inventory is in continuous cyclic reuse in the precipitators). The partly spent liquor is further cooled in the precipitators with fine seed and further precipitation takes place with very fine hydrate produced so that near atmospheric temperature, the fully spent liquor has an alumina content of about 30 grams per liter with 20 grams per liter of off-specification alumina (or 180 kilograms per minute) being produced. The other 1,000 liters per minute of the above 5,000 liter flow is separated from its specification alumina down to a content of 50 grams per liter, but is not stripped further. Instead, it is reheated together with the 180 kilograms of off-specification alumina, bringing it up to 130 grams per liter, for enriching bauxite digestion liquor. Compared with this process, a conventional process plant which does well to precipitate half the alumina held in solution after digestion, might precipitate 50 grams per liter alumina from 4,000 liters or 200 kilograms per minute. This invention, producing 280 kilograms per minute from a 4,000-liter digestion flow is producing 40 percent more alumina than conventional practice.

In the above examples, the American-Bayer process might use for digestion caustic (NaOH) equivalent to about 140 to 200 grams $Na_2CO_3$, as it is often expressed in the United States. Such caustic strengths might be suitable for either gibbsite ores or boehmite ores, but the former could be digested at 280° to 300° F. and the latter at 350° to 450° F. Generally, the lower of the above caustic strengths would be used on the easily soluble gibbsite ores. In European practice, even higher caustic strengths are used. However, the caustic strength may vary widely in the operation of this process. In general, it is preferable to work with the above (American type) relatively lower rather than higher caustic strengths, in order to more completely strip the spent liquor of alumina when it is cooled to atmospheric temperature. This process assures that the clarified liquor after digestion will be enriched to maximum feasible supersaturation before precipitation, so that the precipitators will precipitate rapidly and as completely their full complement of specification alumina hydrate. The prior art thoroughly covers in great detail the suitability of and problems with various caustic strengths and digestion temperatures. This process is not limited to any precise set of conditions excepting as defined in the claims.

Referring now to the drawings, in FIG. 2 the sections A and B correspond fairly closely to existing conventional Bayer-process equipment, while section C constitutes nearly all the new equipment needed by this invention. Section A in general operates at a normal Bayer-process flow rate, but with larger bauxite additions made possible because the return liquor is more completely spent in alumina content. Section B has a flow rate higher than section A because of the added flow from section C, which heats it slightly and enriches it in alumina content. Little if any additional precipitation capacity is needed, although comparatively more specification alumina is precipitated. It will be noted that section C provides the dual function of depleting the alumina content of the spent liquor to make section A more efficient, and also enriching the pregnant liquor to make section B more efficient. Thus, section C is valuable not only in new alumina plants, but also to increase the capacity and efficiency of existing Bayer plants.

While section A of FIG. 2 may contain only conventional Bayer-process equipment, the present invention allows such equipment to be used with more efficient desilication and heat economy. For example, where several pressure digesters are used in series (which is common practice in Bayer-process plants), according to the present invention the primary digester is fed all the bauxite and makeup caustic and steam, but only enough of the hot spent liquor to permit pumping the pulp or slurry into the digester for desilication, while the main stream of less hot spent liquor is added in the following one or more secondary digesters to dissolve alumina. As shown in FIGS. 3 and 4, all ores having appreciable amounts of the easily soluble gibbsite minerals can be treated in this way. The lower temperatures and pressures in the secondary digesters resulting from this practice result in less heat (steam) needed and in equipment simplification. Even if the secondary digesters are kept at the same temperature as the primary digester, savings are effected through less retention time for the main flowstream at such temperatures. By this means the wasteful practice of heating and holding the main Bayer-process flowstream at desilication temperatures is avoided and only about 4 to 20 percent of the spent liquor need be brought to desilication temperatures and held there. The exact amount required depends on the consistency of the resultant slurry necessary to make pumping into the primary (desilication) pressure digester possible. The temperatures of the secondary digester may be from 300° F. down to the boiling point, which, due to dissolved caustic and alumina may be close to 220° F. at sea level. Heating of the main stream of spent liquor can be limited to that needed to reach alumina saturation at about 240° F. when combined with the desilicated slurry at 280° to 350° F., usually about 290° F. Ores suitable to the flowsheet of FIG. 3 include the Weipa ores of Northeastern Australia, many ores in Jamaica which are mixtures of boehmite and gibbsite and generally the ores in the rest of the West Indies, Africa and Europe of like character. Ores suitable to the flowsheet of FIG. 4 include some West Australian and British and Dutch Guiana (Demerara and Surinam) gibbsite ores as well as those from the state of Arkansas in the U.S. and certain portions of Jamaica and the East Indies and Malaya. Even those ores may contain 1 to 5 percent of boehmite which not only reduces recoveries, but limits $a/c$ ratios obtainable by digestion. This process, which utilizes lower spent liquor ratios overcomes this difficulty.

The treatment of a Jamaican bauxite containing a significant quantity of boehmite in addition to gibbsite is set forth in Example III below and is illustrated in FIG. 3. This ore is identifiable by an ignition loss of 25–26 percent.

EXAMPLE III

The ground ore is charged to the primary digester with 20 percent of the recycle liquor, heated with steam to about 300° F., and makeup caustic. It is here treated at 290° F. for about 30 minutes, for desilication. The temperature may vary from about 270° to 320° F. The slurry is then pumped to the secondary digesters, where about 40 percent of the recycle liquor is added, and held at 240° F. for 15 minutes. An acceptable temperature range would be 225° to 290° F. at this stage. Under these conditions, gibbsite will dissolve in the liquor, but boehmite will not. The spent liquor contains about 170 grams per liter of free soda ($Na_2CO_3$ equivalent) and a saturation ratio of about 0.2 to 0.3. About 60 percent of the available alumina is extracted at this point. The slurry is then passed through suitable heat exchange equipment such as flash tanks and steam heaters where a portion of its sensible heat is transferred to the recycle liquor and its temperature is reduced to the 200°–225° F. range. Clarifier A, which may be, for example, a Dorr thickener which separates 80 percent of the liquor from the red mud in a single stage. The saturation ratio of the liquor at this point is about 0.56.

The unwashed red mud, containing boehmite values and at a consistency of 15 to 40 percent solids (usually 18–25 percent) is subjected to a boehmite digestion step at 400° F. for 30 minutes by heating with the remaining 40 percent of the recycle liquor. The temperature at this stage may vary from 350° to 550° F. About 80 percent of the remaining 40 percent of the alumina is extracted in this stage, which means that the overall extraction of available alumina is 92 percent. The slurry is then cooled countercurrent to the spent liquor to the 200°–225° F. range and passed to clarifier B, which again could be a Dorr thickener. The red mud is washed with hot water before being passed to waste. The two liquor streams are combined at clarifier C, a suitable polishing filter operated at the same temperature range. The saturation ratio at this point is 0.58 which will be raised higher by blending with the hot saturated liquor from section C (FIG. 2).

The treatment of a typical trihydrate ore containing 55% $Al_2O_3$ and 5% $SiO_2$ is set forth in Example IV and is illustrated in FIG. 4. Less than 5 percent of the alumina in this ore is boehmite.

EXAMPLE IV

Twenty percent of the spent liquor ($a/c$=0.2 to 0.3) recycle stream is heated to 300° F., mixed with the ground ore and passed to the primary digester, where it is maintained for 40 minutes at 290° F. The thick slurry is then passed to the secondary digester and mixed with the remainder of the recycle liquor. Digestion of contained gibbsite is carried out at about 240° F. for 20 minutes. Cooling and clarifying are carried out as in Example III, and the red mud is washed and passed directly to waste. The liquor has a saturation ratio of 0.6 and 102 grams per liter caustic.

A thick slurry of fine, offgrade alumina trihydrate particles is mixed with heated, partly spent liquor and passed to the fine hydrate digester, where it is maintained at 290° F. for about 20 minutes. Flow rate at this stage is about 20 percent of the flow through the main digesters.

The effluent has a saturation ratio of 0.7 and a caustic concentration of 120 grams per liter. A mixing step is desirable with this concentrated liquor to prevent premature precipitation of alumina in the heat exchanger, a possibility due to the high saturation ratio. The amount of main stream liquor added will depend on exact ratios present in both streams, but may amount to 20 percent of the spent liquor flow rate. The cooled (200° F.) stream has an $a/c$ ratio of 0.65 and an alumina concentration of 111 grams per liter, and the combined streams, ready for vacuum cooling and precipitation, have 0.62 $a/c$ and 105 grams of alumina per liter. The flow rate at this stage is 120 percent of the spent liquor flow rate.

Compared to conventional Bayer processing of a similar material, this example shows a production increase of specification grade alumina amounting to 27 percent and significant heat economy, the latter owing to the fact that only 40 percent of the spent (and partly spent) liquor is heated to 290° F.; the major portion is heated only to 240° F.

EXAMPLE V

As another example of the process shown in FIG. 3, the following conditions may be used: a Jamaican-type bauxite identifiable by an ignition loss of about 20 percent is digested for about 30 minutes at 290° F. with a spent liquor having 170 grams per liter of free soda and an $a/c$ ratio of 0.2 to 0.3, to obtain a 56 percent extraction of available alumina. Thereafter, the red mud is settled in Dorr thickeners and is redigested at 425° F. for 10 to 15 minutes, attaining an 85 percent extraction of the remaining 44 percent. Overall extraction by digestion is about 93 percent. The finish ratio of the combined digestion streams is brought to about 0.60 $a/c$ ratio by the method illustrated in FIG. 3 and previously discussed. The above examples utilizing mixtures of gibbsite and boehmite ores represent the minimum results estimated attainable by the invention. The amount of gibbsite which can be dissolved from an ore mixture with boehmite without reprecipitation thereof on the suspended monohydrate crystals (acting as seed) proceeding as rapidly as the solution of the trihydrate crystals depends on the $a/c$ ratio. The low spent liquor $a/c$ ratios of this invention ranging generally from 0.3 down to 0.2 permit greater alumina extraction with any given quantity of spent liquor and bauxite than conventional Bayer practice. As noted above, the $a/c$ ratio in conventional Bayer spent liquor is usually a minimum of about 0.3, because only specification grade hydrate is precipitated therefrom, and lower ratios produce hydrate so fine that it cannot even be used as seed.

With the above reprecipitation phenomena during digestion in mind, the embodiment of FIG. 4 shows that the higher ratio liquor of 0.7 or more attainable in the digestion of fine hydrate with partly spent liquor (in which no suspended boehmite is present) may be simultaneously cooled and diluted (before flash cooling) by mixing it with a lower ratio clear pregnant liquor from the main bauxite digestion to prevent precipitation by supersaturation in the flash cooling stage before the precipitators are reached. Likewise in FIG. 3, the higher ratio in liquor attainable by digestion of boehmite at high temperatures may be diluted to a lower ratio and simultaneously cooled before flash cooling in the same manner.

Although the flowsheet of FIG. 4 is more generally applicable to ores containing gibbsite, it should be noted that a bauxite such as that given in Example V above may easily result in an 80 percent extraction in a straight Bayer-process digestion at 290° F. and 170 grams per liter or less free soda and, with an $a/c$ ratio of 0.56. Utilizing the same digestion conditions, but with the lower 0.2 to 0.3 starting ratio of this invention in FIG. 4, a 90 percent extraction may be obtained and the bauxite digestion $a/c$ ratio of 0.56 can be maintained at 0.56. Thus the process of FIG. 4 will be seen to permit Bayer-process plants to be easily converted to treating ores with up to 5 percent boehmite.

Various changes in the details, steps, materials and arrangements of parts, which have been herein described and illustrated in order to explain the nature of the invention, may be made by those skilled in the art within the principle and scope of the invention.

What is claimed is:

1. In a process for producing specification grade alumina from bauxite minerals having a main process stream including digestion and desilication of said minerals in hot caustic to form a pregnant liquor, removal of insoluble residue therefrom, cooling to precipitate a portion of the alumina as specification grade alumina trihydrate on seed crystals, and recovery of said trihydrate and a partly spent liquor, the improvements comprising:
   a. further cooling said partly spent liquor and precipitating therefrom fine crystals of alumina trihydrate;
   b. separating said fine crystals from the now spent liquor;
   c. dissolving said fine crystals in an alumina bearing, hot caustic liquor to form a hot liquor of increased alumina content;
   d. cooling and seeding said increased alumina liquor to precipitate additional specification grade alumina trihydrate; and
   e. recovering said additional alumina trihydrate.

2. The process as claimed in claim 1, wherein he liquor utilized in step (c) is clarified pregnant liquor.

3. The process as claimed in claim 1, wherein step (a) is carried out on a portion only of said partly spent liquor, and the hot caustic liquor of step (c) comprises the remainder of said liquor.

4. The process as claimed in claim 1, wherein steps (d) and (e) are carried out by blending said increased alumina liquor with the pregnant liquor of the main process stream after separation of said insoluble residue.

5. The process as claimed in claim 4, and additionally comprising recycling the spent liquor recovered in step (b) to the digestion and desilication stage of the main process stream.

6. The process as claimed in claim 5, wherein the saturation ratio of said spent liquor is less than 0.3.

7. The process as claimed in claim 4, wherein the saturation ratio of said increased alumina liquor is 0.6 or greater.

8. A continuous process for producing specification grade alumina from bauxite minerals comprising:
   a. desilicating and digesting said minerals in hot caustic to form a pregnant liquor and a red mud;
   b. separating said liquor from said red mud;
   c. adding to said liquor the hot alumina-bearing liquor produced in step (k);
   d. cooling the combined liquor to produce a supersaturated liquor;
   e. seeding said supersaturated liquor with crystals of alumina trihydrate having a fineness suitable for use as seed and precipitating therefrom specification grade alumina trihydrate;
   f. separating said trihydrate from the now partly spent liquor;
   g. calcining said trihydrate to form specification grade anhydrous alumina;
   h. further cooling a portion of said partly spent liquor and precipitating therefrom alumina trihydrate crystals of finer than specification grade;
   i. separating said finer crystals from the now spent liquor;
   j. recycling a portion of said finer crystals for use as seed in step (e);
   k. dissolving the remainder of said finer crystals in the remainder of said partly spent liquor to form a hot alumina-bearing liquor for use in step (c); and
   l. heating and recycling the now spent liquor for use in step (a).

9. The process as claimed in claim 8, wherein step (a) is carried out in a plurality of stages, and a minor proportion of the recycle liquor from step (1) is mixed with said minerals to form a pumpable slurry in the first of said stages, which is carried out at a temperature in the range of 270° to 320° F., and the major portion of said liquor is added at the second of said stages, which is carried but at a temperature in the range of 225° to 290° F.

10. The process as claimed in claim 8, wherein the saturation ratios of the spent liquor, partly spent liquor, the alumina-bearing liquor and the combined liquor are, respectively, less than 0.3, 0.3 or greater, greater than 0.6, and 0.6 or greater.

11. The process as claimed in claim 9, wherein said bauxite contains a mixture of gibbsite and boehmite mineral phases, and additionally comprising:
mixing said red mud with a portion of said spent liquor in a boehmite digestion stage carried out at a temperature in the range of 350° to 550° F. to form liquor containing dissolved boehmite values and a residue; and
separating said liquor from said residue; and returning said liquor to step (c).

12. The process as claimed in claim 10, wherein a portion of the liquor separated in step (b) is added to the liquor produced in step (k), thereby reducing the saturation ratio of the latter.

13. The process as claimed in claim 8, wherein heat required in step (k) is supplied, in part, by indirect heat exchange with the hot alumina-bearing liquor.

14. The process as claimed in claim 8, wherein heat required in steps (l) and (a) is supplied, in part, by indirect heat exchange with the products of step (a).

15. A continuous process employing a circulating caustic solution for producing specification grade alumina from bauxite minerals comprising:
a. desilicating said minerals at an elevated temperature with sufficient recycled caustic to form a pumpable slurry;
b. digesting said minerals with the remainder of the recycled caustic to form a pregnant liquor and a red mud;
c. separating said pregnant liquor from said red mud;
d. using a portion of said pregnant liquor to dissolve the fine crystals from step (i), and form an enriched liquor;
e. combining the enriched liquor of step (d) which the remaining pregnant liquor;
f. cooling the combined liquor from step (e) to produce a supersaturated liquor;
g. adding seed crystals from step (j) to the supersaturated liquor and precipitating therefrom specification grade alumina trihydrate, seed crystal size alumina trihydrate and fine crystal size alumina trihydrate;
h. separately recovering the three trihydrate grades produced in step (g) from the now-spent liquor;
i. recycling said fine crystals for dissolution in pregnant liquor in step (d);
j. recycling said seed crystals to step (g);
k. calcining the specification grade trihydrate; and
l. recycling the spent liquor from step (h) to steps (a) and (b).

16. The process as claimed in claim 15, wherein step (b) is carried out at a lower temperature than step (a).

17. The process as claimed in claim 15, wherein the saturation ratio of the combined stream in step (e) is greater than 0.6 and the saturation ratio of the spent liquor in step (h) is less than 0.3.

18. The process as claimed in claim 15, wherein heat is supplied to step (d) and the enriched liquor is cooled prior to step (e) by indirect heat exchange with the pregnant liquor utilized in step (d).

19. In the Bayer process for producing alumina from bauxite by desilicating and digesting the bauxite in a recycled hot caustic flowstream, separating the residue, cooling and precipitating the alumina and recycling the caustic, the improvements comprising carrying out a primary digestion for desilication with all of said bauxite mixed with all of the needed fresh makeup caustic and only a sufficient portion of said recycled caustic flowstream to make a pumpable slurry and provide a liquor for desilication of high causticity, followed by a secondary digestion with the remainder of said caustic flowstream.

20. The process as claimed in claim 19, wherein said primary digestion is carried out at a higher temperature than said secondary digestion.

21. The process as claimed in claim 20, wherein said primary digestion is carried out at a temperature in the range of about 270° to 320° F., and said secondary digestion is carried out at a temperature in the range of about 225° to 290° F.

22. The process as claimed in claim 19, wherein the portion of said recycled hot caustic flowstream which is mixed with said bauxite and said makeup caustic is in the range of 4 to 20 weight percent.

* * * * *

UNITED STATES PATENT OFFICE
CERTIFICATE OF CORRECTION

Patent No. 3,632,310                    Dated January 4, 1972

Inventor(s)  Arthur F. Johnson

It is certified that error appears in the above-identified patent and that said Letters Patent are hereby corrected as shown below:

On the cover sheet, Abstract, line 6, "state" should read -- stage --. Cancel columns 3 thru 14 and substitute the attached columns 3 thru 14.

Signed and sealed this 8th day of May 1973.

(SEAL)
Attest:

EDWARD M. FLETCHER, JR.                ROBERT GOTTSCHALK
Attesting Officer                      Commissioner of Patents